United States Patent [19]

Striegl et al.

[11] Patent Number: 6,030,905

[45] Date of Patent: Feb. 29, 2000

[54] FILTER MATERIAL CONTAINING THERMOPLASTIC, ELASTOMER COPOLYETHER ESTERS, METHOD OF PRODUCING THE SAME, USE THEREOF, AND FILTER PRESS THEREFROM

[75] Inventors: Peter Striegl; Achim Sohn, both of Bobingen, Germany

[73] Assignee: Johns Manville International, Inc., Denver, Colo.

[21] Appl. No.: 09/048,481

[22] Filed: Mar. 26, 1998

[30] Foreign Application Priority Data

Apr. 1, 1997 [DE] Germany .......................... 197 13 429

[51] Int. Cl.$^7$ .................................................. B01D 25/00
[52] U.S. Cl. ............................ 442/184; 442/306; 442/49; 442/50; 210/224; 26/1
[58] Field of Search .................................... 442/184, 306, 442/49, 50; 210/224; 26/1

[56] References Cited

U.S. PATENT DOCUMENTS 5,533,789  7/1996  McLarty, III et al. ............. 297/452.64

FOREIGN PATENT DOCUMENTS 379967    8/1990  European Pat. Off. .
7-088306  4/1995  Japan .
7-096105  11/1995 Japan .

*Primary Examiner*—Christopher Raimund
*Attorney, Agent, or Firm*—Burns, Doane, Swecker & Mathis, L.L.P.

[57] ABSTRACT

A filter material is described containing synthetic yarns based on a thermoplastic, elastomer copolyether ester. The yarns contain at least 70 wt. %, referred to total yarn weight, of a thermoplastic, elastomer copolyether ester containing at least 95 wt. %, referred to the total weight of the thermoplastic, elastomer copolyether ester, of the recurrent structural units of formulas I and II, $$-O-OC-Ar^2-CO-O-R^4 \quad (I)$$

and $$-O-OC-Ar^3-CO-O-R^5 \quad (II),$$

where $Ar^2$ and $Ar^3$ independently of each other represent bivalent aromatic radicals, $R^4$ represents a bivalent aliphatic or cycloaliphatic radical, and $R^5$ stands for the bivalent radical of a polyalkylene ether.

The invention also relates to a method of producing this filter material and to a filter press containing such a filter material.

8 Claims, No Drawings

FILTER MATERIAL CONTAINING THERMOPLASTIC, ELASTOMER COPOLYETHER ESTERS, METHOD OF PRODUCING THE SAME, USE THEREOF, AND FILTER PRESS THEREFROM

New filter materials are described, containing thermoplastic, elastomer copolyether esters according to Claim 1, as well as a process for production of the filter materials, and the use of the filter materials in filter presses, preferably chamber filter presses. Chamber filter presses containing the said filter materials are described as well.

Filter presses, as described for example in *Ullmanns Encyklopädie der technischen Chemie,* 4th ed., Tome 2, Vol. 2, pp. 178–181, are much employed for filtration in large-scale industry especially. Depending on intended application, filter presses of various types are used. Frame filter presses consist of filter panels and frames mechanically or hydraulically compressed during filtration to seal off the filtration spaces. Chamber filter presses consist of plates having a marginal bulge, so that in this type a frame may be dispensed with. By virtue of this design, chamber filter presses have the advantage that when the presses is opened to change the filter material or to remove the filter cake, only about half of the filter elements need be moved. If the filter plates in the filter presses described are covered with a rubber membrane, after filtration the filter cake can be compressed by pressure on the rubber membranes, yielding a simplified detachment of the filter cake.

The filter materials in filter presses, especially chamber filter presses, are subjected to exacting requirements. They must exhibit a good retention, lead to a residue-free filtrate and as dry a filter cake as possible. The yarns, or monofils, used to produce the filter materials, must have high dimensional stability, chemical resistance, lifetime, filtering effectiveness and mechanical strength. Known filter materials for filter presses consist of polyester monofils. Such monofils are distributed for example by Hoechst Trevira GmbH & Co. KG under the trade name ®Trevira Monofil. Filter materials of this monofil are distinguished by high strength and simplicity of recycling due to the purity of type proper to these monofils.

Filter materials in chamber filter presses should not only exhibit a high strength but also be especially long-lived, so that they will survive a large number of cleaning cycles. If during a cleaning cycle there should be overextension or even destruction of individual threads in the filter material, as a rule the entire filter cloth must be replaced. To that end, European Patent EP B 0,521,512 describes improved filter cloth units. The filter cloth consists of monofil fabrics to which a supporting needle felt has been applied for reinforcement in the marginal region.

EP A 0,379,967 describes a monofil with elastic properties, containing a thermoplastic polyether ester elastomer and a polyurethane. Besides, the production of industrial textiles by weaving, knitting or braiding is proposed. Among the enumerated uses for the elastic monofil are found coating fabrics, membranes, elastic strips and filter fabrics. The use of monofils in fabrics for filter presses is not disclosed in that printed source.

The thermoplastic polyether ester elastomer contains, as elastomer component, 5 to 50 wt. % of a polyurethane. The monofils produced therefrom exhibit a maximum tensile elongation of 60%.

Elastic monofilaments of polyether esters containing no polyurethane are known and distributed for example under the trade name ®Elas-Ter of Hoechst Celanese Corp., USA.

These monofilaments are produced from a thermoplastic copolyether ester under the trade name ®Riteflex (Hoechst Celanese Corp., USA) and employed to produce areal textile configurations for automobile seat covers.

Thus there remains a need for filter materials of simple structure and durable for filter presses, preferably chamber filter presses, affording not only an improved retention and hence longer life but cost-effective recycling at the same time.

The present invention relates to a filter material containing synthetic yarns based on a thermoplastic, elastomer copolyether ester, characterized in that the yarns consist more than 70 wt. % referred to the total yarn weight, of a thermoplastic, elastomer copolyether ester containing at least 95 wt. %, preferably 98 wt. %, referred to the total weight of the thermoplastic, elastomer copolyether ester, of the recurrent structural units of formulas I and II, $$-O-OC-Ar^2-CO-O-R^4- \quad (I),$$

and $$-O-OC-Ar^3-CO-O-R^5- \quad (II),$$

where $Ar^2$ and $Ar^3$ independently of each other represent bivalent aromatic radicals, $R^4$ represents a bivalent aliphatic or cycloaliphatic radical, and $R^5$ stands for the bivalent radical of a polyalkylene ether.

The term 'yarn' in the context of the present description is to be understood in its broadest imaginable sense. The term includes for example monofilaments, multifilament yarns, staple fiber yarns, bicomponent yarns and mixtures of these yarns. Preferably the yarns in the filter material according to the invention are monofilament yarns, that is, so-called monofils.

By a 'thermoplastic, elastomer copolyether ester' in the context of this description is meant a polymer whose vitreous transition temperature is below 23° C., preferably below 0° C.

Preferably, $Ar^2$ and $Ar^3$ independently of each other stand for a phylene and/or a naphthylene radical.

With especial preference, $Ar^2$ and $Ar^3$ each stand for 1,4-phenylene.

$R^4$ as a bivalent aliphatic radical stands for straight-chain or branched alkylene or alkylidene; generally these are radicals having 2 to 20 carbon atoms, preferably 2 to 8 carbon atoms and in particular 2 to 4 carbon atoms.

With especial preference, $R^4$ is straight-chain alkylene having 2 to 6 carbon atoms, in particular ethylene.

$R^4$ as a bivalent cycloaliphatic radical usually stands for a radical containing 5 to 8, preferably 6 ring carbon atoms; with especial preference, this carbon ring is part of an aliphatic chain. An example of an especially preferred representative of this type is the radical of cyclohexanedimethanol.

With especial preference, $R^4$ is a radical of the formula $-C_nH_{2n}-$, where n is a whole number between 2 and 6, or a radical derived from cyclohexanedimethanol.

$R^5$ as a bivalent radical of a polyoxyalkylene usually stands for a polyether radical exhibiting recurrent oxyethylene, oxypropylene or in particular oxybutylene units or mixtures of these units.

With especial preference, $R^5$ represents a radical of the formula III, $$-[C_oH_{2o}-O]_z-C_oH_{2o}- \quad (III),$$

where o stands for a whole number from 2 to 4 and z is a whole number from 1 to 50.

With quite especial preference, o stands for 4 and z is a whole number from 10 to 18.

With especial preference, thermoplastic and elastomer copolyether esters containing the recurrent structural units of formulas I and II as defined above are employed in which $Ar^2$ and $Ar^3$ stand for 1,4-phenylene, $R^4$ is ethylene, $R^5$ is a group of the above defined formula III, o stands for 4, and the proportion of the recurrent structural units of formula III, referred to the proportion of the polyester molecule, is 5 to 60 wt. %.

Yarns consisting of such thermoplastic elastomer copolyether esters possess different melting points depending on the proportion of the recurrent structural units of formula III; the higher the proportion of these structural units, the lower the melting point can be set. Thus for example yarns of a thermoplastic and elastomer copolyether ester of this type having a content of 13 wt. % poly-oxybutylene exhibit a melting point of about 220° C., whereas yarns of a thermoplastic and elastomer copolyether ester of this type having a content of 53 wt. % poly-oxybutylene exhibit a melting point of about 160° C.

If any radicals stand for bivalent aliphatic radicals in the structural formulas defined above, this is to be understood to mean branched and in particular straight-chain alkylene, for example alkylene having 2 to 20, preferably 2 to 8 carbon atoms. Examples of such radicals are ethane-1,2-diyl, propane-1,3-diyl, butane-1,4-diyl, pentane-1,5-diyl, hexane-1,6-diyl or octane-1,8-diyl.

If any radicals in the structural formulas defined above stand for bivalent cycloaliphatic radicals, this is to be understood to mean groups containing carbocyclic radicals having 5 to 8, preferably 6 ring carbon atoms. Examples of such radicals are cyclohexane-1,4-diyl or the group $CH_2$—$C_6H_{10}$—$CH_2$—.

If any radicals in the structural formulas defined above stand for aromatic radicals, these are uni- or multinuclear aromatic hydrocarbon radicals or heterocyclic aromatic radicals which may be uni- or multinuclear. In the case of heterocyclic aromatic radicals, these in particular exhibit 1 or 2 oxygen, nitrogen or sulfur atoms in the aromatic nucleus.

Multinuclear aromatic radicals may be condensed with each other or connected with each other by way of C—C bindings or by way of bridge groups such as —O—, —S—, —CO—, or —CO—NH— groups.

The valence bindings of the bivalent aromatic radicals may be in para- or comparable coaxial or parallel position relative to each other, or else in meta- or comparable angled position to each other.

The valence bindings standing in coaxial or parallel position in relation to each other are oppositely directed. An example of coaxial, oppositely directed bindings are the biphen-4,4'-diyl bindings. An example of parallel, oppositely directed bindings are the naphthaline-1,5- or -2,6-bindings, while the naphthaline-1,8-bindings are parallel like-directed.

Examples of preferred bivalent aromatic radicals whose valence bindings are in para- or comparable coaxial or parallel position to each other are uninuclear aromatic radicals with free valences in para position to each other, in particular 1,4-phenylene or binuclear condensed aromatic radicals having parallel, oppositely directed bindings, in particular 1,4-, 1,5- and 2,6-naphthylene, or binuclear aromatic radicals linked by way of a C—C binding with coaxial, oppositely directed bindings, in particular 4,4'-biphenylene.

Examples of preferred bivalent aromatic radicals whose valence bindings are found in meta- or comparable angled position to each other are uninuclear aromatic radicals with free valences in meta- position to each other, in particular 1,3-phenylene or binuclear condensed aromatic radicals with bindings directed at an angle to each other, in particular 1,6- and 2,7-naphthylene, or binuclear aromatic radicals linked by way of a C—C bond with bindings directed at an angle to each other, in particular 3,4'-biphenylene.

If any radicals stand for bivalent araliphatic radicals, these are understood to mean groups containing 1 or more bivalent aromatic radicals combined with an alkylene radical by way of one or both valences. A preferred example of such a radical is the group —$C_6H_4$—$CH_2$—.

The recurrent structural units of formula I or II are typical hard or soft segments respectively. Thermoplastic polyesters of this type are known and described for example in Domininghaus, *Die Kunststoffe und ihre Eigenschaften* [The synthetics and their properties], 3rd ed., VDI Verlag GmbH, Düsseldorf 1988, pp. 518–524.

All of these aliphatic, cycloaliphatic, aromatic, araliphatic or polyoxyalkylene radicals may be substituted with inert groups. By this is meant substituents that do not negatively affect the application in view.

Examples of such substituents are alkyl, alkoxy or halogen.

By alkyl radicals are meant branched and in particular straight-chain alkyl, for example alkyl having 1 to 6 carbon atoms, in particular methyl.

By alkoxy radicals are meant branched and in particular straight-chain alkoxy, for example alkoxy having 1 to 6 carbon atoms, in particular methoxy.

If any radicals stand for halogen, this is for example fluorine, bromine or in particular chlorine.

For the production of the filter materials according to the invention, such yarns are chosen as consist at least 70 wt. %, preferably at least 95 wt. %, in particular more than 98 wt. % of the thermoplastic elastomer copolyether esters hereinbefore described. Quite especially preferred are yarns consisting wholly of the thermoplastic elastomer copolyether esters above described.

Besides the thermoplastic, elastomer copolyether esters, the yarns may contain up to a quantity of 30 wt. % of elastomer or non-elastomer spinnable polymers different from the thermoplastic, elastomer copolyether esters above described. These may for example be elastomer or non-elastomer spinnable polymers based on polyesters, polyamides or polyurethanes, or polyolefins.

The thermoplastic elastomer copolyether ester may, without reducing the utility of the filter material according to the invention, contain still other block copolymers, as for example small amounts of copolymers based on non-elastomer or elastomer polyamides or polyurethane. In general, the proportion of polyurethane is below 5 wt. %, preferably below 2 wt. %, referred to the total quantity of the thermoplastic elastomer copolyether ester. Especially preferred are thermoplastic, elastomer copolyether esters consisting exclusively of block polymers based on polyesters.

An example of a commercial thermoplastic elastomer copolyether ester suitable for the production of the yarns, preferably the monofilaments, in the filter materials according to the invention, is the product obtainable under the designation ®Riteflex from the firm of Hoechst Celanese Corp.

Besides the copolyester above described, the yarns may also contain small amounts of admixtures and additives of a non-polymer kind, as e.g. catalyst residues, modifying additives, fillers, matting agents, pigments, dyes, stabilizers, such as UV absorbers, antioxidants, hydrolysis, light and temperature stabilizers and/or processing aids, plasticizers or lubricants. Preferably these additives are present in a concentration from 0.01 to 5 wt. %, in particular 0.1 to 2 wt. %. The catalyst residues may for example be antimony trioxide or tetraalkoxytitanate. As processing aids or lubricants, use may be made of siloxanes, in particular polymer dialkyl or diaryl siloxanes, salts and waxes as well as longer-chain organic carboxylic acid, that is, such having more than 6 carbon atoms, aliphatic, aromatic and/or perfluorinated esters and ethers in amounts up to 1 wt. %. The yarns may also contain inorganic or organic pigments or matting agents, as for example organic dye pigments or titanium dioxide, or carbon black as a color or conductivity additive. As stabilizers, for example phosphorus compounds, as e.g. phosphoric acid esters, sre employed, and besides, if required, viscosity modifiers and substances for modifying the crystallite melting point or vitreous transition temperature or such as affect crystallization kinetics, or the degree of crystallization, may be used. As viscosity modifiers, for example multivalent carboxylic acids or their esters, as trimesic or trimellitic acid, or multivalent alcohols, as e.g. diethylene glycol, triethylene glycol, glycerin or pentaerythritol are used. These compounds are either mixed in small amount with the finished polymers or, preferably, added in desired quantity as copolymerization constituents in the production of the polymers.

The yarns that may be employed in the filter material according to the invention preferably exhibit a knot strength of at least 8 cN/tex, in particular 12 cN/tex.

Preferably the yarns exhibit a maximum tensile elongation between 65 and 110%. Especially preferred are yarns exhibiting a maximum tensile elongation from 70 to 90%, in particular 75 to 85%.

The strength and maximum tensile elongation were determined according to DIN ISO 2062 (1995).

The knot strength (knot tensile test) was determined according to DIN 53842 Part 1, where, in departure from the standard, knots with direction of rotation Z were always made in the strength test.

The fluid transmissivity of the filter material according to the invention is a measure of the filtration effect and must be adjusted to the desired field of application, as for example for use in chamber filter presses, the desired material to be filtered and the intended filtration effect. The liquid transmissivity can be specified in a defined manner by measurement of the gas transmissivity. It has been found that the gas transmissivity of the filter fabric, for example for use in chamber filter presses, must lie in the range from 1 to 300 l/dm².

Preferably the filter material according to the invention exhibits a gas transmissivity in the range from 1 to 100 l/dm² per minute, with especial preference between 5 and 30 l/dm² per minute. Especially preferred is a gas transmissivity in the range from 10 to 20 l/dm² per minute.

The gas transmissivity was determined according to DIN 53887 at a pressure drop of 200 Pa.

The filter material according to the invention exhibits a surprisingly long life. Especially when the filter material is employed in chamber filter presses, it must survive a large number of cleaning cycles.

During a cleaning cycle, the filter fabric is stretched by a certain amount and relieved again. A good filter material, even after many cleaning cycles, retains its original stability of shape. As has been found, an especially practical method of measurement to characterize this property is the so-called long-term dimensional stability. The long-term dimensional stability is defined in analogy to the tensile stress coefficient $C_n$ described in DIN 53835 Part 2.

Determination of long-term dimensional stability:

Long-term dimensional stability was determined largely in accordance with the hysteresis tensile test of DIN 53835 Part 2. In the hysteresis tensile test, a yarn contained in the filter material is strung between two clamps in a tensile testing machine (type, UPM Zwick 1455). By moving the clamps, a tensile stress is applied to the yarn, the clamps moving between an upper and a lower elongation limit. Thus the sample is continuously stretched at a preassigned clamp velocity between the elongation limits, with no pause at the turning points. Meanwhile, the tensile stress—length variation curves are plotted. The tensile stress coefficient $C_n$ in each elongation cycle (n=number of elongation cycles) is obtained as the ratio of the tensile stress at half total elongation under load to the tensile stress at total elongation.

On the basis of the special requirements to be fulfilled by a filter material, for example for use in chamber filter presses, and the nature of the monofils contained in the filter materials according to the invention, DIN 53835 Part 2 requires modification as follows:

Number of elongation cycles 100

Lower elongation limit 5%

Upper elongation limit 10%

Prestress (stress at which the sample is strung in the testing machine) 0.25 cN/tex Free strung length 500 mm Clamp velocity 500 mm/minute Number of measurements for the mean, 10

The determination of long-term dimensional stability as described above may be performed on dry yarns in standard atmosphere or, as is closer to the conditions present in service of the filter material, on wet yarns. To determine the long-term dimensional stability with wet yarns, the samples were stored in tap water at room temperature for at least 24 hours before testing. The specimens were taken out singly and tested after at most 60 seconds.

The yarns in the filter material according to the invention preferably exhibit a long-term dimensional stability $C_{100}$ of more than 0.60. With especial preference, the value of the long-term dimensional stability $C_{100}$ is above 0.65, in particular in a range from 0.67 to 0.8.

Preferably the yarns in the filter material according to the invention exhibit a softening point between 110° and 200° C. The melting point of the yarn is preferably between about 150° and 235° C., in particular between about 190° and 210° C.

The strength of the yarns is preferably at least 12 cN/tex. Especially preferred are yarns having the strength of at least 17 cN/tex, in particular at least 20 cN/tex.

The yarns for production of the filter material according to the invention preferably exhibit a diameter between 10 and 1500 $\mu$. With especial preference, the diameter is in the range from 100 to 800 $\mu$. The titer is preferably in a range from about 1 to 24400 dtex, in particular 300 to 1100 dtex.

To improve filter quality, the diameter of the usable yarns fluctuates along their lengthwise axis, referred to the mean diameter of the yarn, preferably by only ±5%, in particular by only about ±3%. Especially preferred are yarns having a diameter fluctuating very slightly, by ±1%.

The yarns described above preferably exhibit a thermal shrinkage at a temperature of 180° C., above the thermal shrinkage of polyethylene terephthalate. In general, the values of the thermal shrinkage are below 50%, in particular below 30%. Especially preferred are yarns exhibiting a thermal shrinkage in the range from 20 to 25%.

The filter materials according to the invention consist essentially of the yarns described above. This means that the areal textile configurations consist predominantly, i.e. at least 65 wt. %, of the yarns described above. Especially preferred, according to the invention, are filter materials consisting at least 80 wt. %, in particular at least 95 wt. %, of the yarns above described.

The areal textile configuration employed in the filter material according to the invention is of single- to 3-layer structure as a rule, exhibiting a weight per unit area of 100 to 800 g/m$^2$, preferably 200 to 600 g/m$^2$.

The yarns described above may be processed to areal textile configurations by weaving, knitting, spiraling or netting. Alternatively, however, it is possible that to produce the filter materials according to the invention, besides monofilaments, use may also be made of multifilament yarns or staple fiber yarns. Use of monofilaments is preferred.

If the areal textile configurations are employed in the form of spiraled cloths, both the spirals and the lacing wires may consist of elastic material. Alternatively, however, it is possible that either only the spirals or only the wires consist of elastic material.

The yarns employed to produce the filter materials according to the invention are preferably woven on today's conventional looms, using the conventional parameters for weaving polyethylene terephthalate, to produce the areal textile configurations. With especial preference, the yarns are woven on conventional broad looms with the usual machine parameters for weaving polyethylene terephthalate, to make the areal textile configurations.

The liquid transmissivity of the filter material may be adjusted by means known per se, as for example choice of binding, titer, weight per unit area etc., within wide limits. In this way, filter action can be adapted to the particular field of employment of the filter material.

In contradistinction to known filter materials, the filter materials according to the invention are especially resistant to the action of UV light, chlorine, alkaline medium and the action of hot water or steam.

Besides, the filter materials according to the invention exhibit an especially high dye absorption. They will therefore tint especially well.

The mechanical properties of the filter materials according to the invention under the aggressive conditions of a chamber press are especially good. Thus for example the abrasion resistance of the filter material according to the invention is higher than that produced from PET yarns.

With especial advantage, the filter material according to the invention is used when type purity is important as well as especially good mechanical properties. Type purity results in greatly simplified recyclability.

Surprisingly enough, the so-called filter cake waste of the filter material according to the invention can be still further improved if preferably the areal textile configuration hereinbefore described is thermally pressed or calendered on one or both sides. The filter material then exhibits an enhanced surface smoothness.

By the term "monofil" in the present invention is meant a single endless fiber of definite thickness. It may be of any cross-section, for example round, oval or elliptical, bi- or multilobal, strip-like or n-gonal. Round monofils are preferred.

The invention also embraces a method of producing filter materials, an areal textile configuration being produced from one or more yarns according to Claim 1 by weaving, netting, knitting or spiraling and the areal textile configuration being made up in known manner as a filter fabric.

Preferably the filter materials are made of monofilaments.

The pore size of the areal textile configuration may preferably be so chosen by selection of yarn type, yarn titer, surface density, binding and/or subsequent finishing that the gas transmissivity, as a measure of the liquid transmissivity, measured at a pressure drop of 200 Pa according to DIN 53887 lies in the range from 1 to 300 l/dm$^2$ per minute.

The present invention also relates to use of the filter materials hereinbefore described, for example for employment in filters in the field of foods industry, chemical industry, dyes industry, galvanic processes, mining, oil industry, or filtration of industrial and municipal wastes.

Preferably the filter materials according to the invention are installed in filter presses, in particular chamber filter presses.

Another object of the invention is a filter press, preferably a chamber filter press, of the filter material hereinbefore described.

EXAMPLES

The following monofilaments were investigated for suitability as filter material:

®Elas-Ter by firm of Hoechst Celanese Corp. (thermoplastic copolyether ester, according to the invention)

PA 6 (®Perlon, polyamide, for comparison)

®Trevira 936B (PBT monofil, for comparison) and

®Trevira 900S (PET monofil, for comparison)

The results of measurements of the specifications of these monofilaments are presented in Table 1.

From the listed monofilaments, a fabric was produced by weaving on a broad loom. Monofils of different diameters were processed. In the warp and in the weft, monofils of 0.20 mm diameter were used. The fabric obtained is as a rule treated on a suitably dimensioned thermofixing means (finishing step) to adjust the specific screening properties desired in a particular case, and processed to a filter material for chamber filter presses.

As it turns out, the filter material from the thermoplastic copolyether ester (®Elas-Ter), compared to filters of polyethylene terephthalate (PET), polybutylene terephthalate (PBT) or polyamide 6 (PA 6) monofils, exhibits a particularly high long-term dimensional stability $C_{100}$ of 0.69 and an outstanding abrasion resistance. For use of the filter material in chamber filter presses, this results in higher dimensional stability in both warp and weft direction and enhanced service life even under severe stress.

TABLE 1

| Test | PA 6 (® Perlon) (comparison) | PBT-Monofil (® Trevira 936B) (comparison) | PET-Monofil (® Trevira 900S) (comparison) | ® ELAS-TER Type 9PX167A (invention) |
| --- | --- | --- | --- | --- |
| Diameter (nom.) [mm] | 0.25 | 0.20 | 0.25 | 0.25 |
| Titer (tr) [dtex] | 518 | 404 | 706 | 637 |
| Strength [cN/tex] | 50 | 40 | 36 | 22 |

TABLE 1-continued

| Test | PA 6 (® Perlon) (comparison) | PBT-Monofil (® Trevira 936B) (comparison) | PET-Monofil (® Trevira 900S) (comparison) | ® ELAS-TER Type 9PX167A (invention) |
|---|---|---|---|---|
| Max. tensile elongation | 49% | 23% | 43% | 82% |
| Knot strength [cN/tex] | 22 | 11 | 21 | 14 |
| Long-term dimensional stability $C_{100}$ -dry- | 0.52 | 0.39 | 0.10 | 0.69 |
| Long-term dimensional stability $C_{100}$ -wet- | 0.54 | 0.41 | — | 0.68 |

We claim:

1. A filter material comprising at least 65 weight percent synthetic yarns based on a thermoplastic, elastomer copolyether ester, wherein the yarns consist of at least 70 wt. %, referred to total yarn weight, of a thermoplastic, elastomer copolyether ester containing at least 95 wt. %, referred to the total weight of the thermoplastic, elastomer copolyether ester, of the recurrent structural units of formulas I and II, $$-O-OC-Ar^2-CO-O-R^4- \quad (I)$$

and $$-O-OC-AR^3-CO-O-R^5- \quad (II),$$

where $Ar^2$ and $Ar^3$ independently of each other represent bivalent aromatic radicals, $R^4$ represents a bivalent aliphatic or cycloaliphatic radical, and $R^5$ stands for the bivalent radical of a polyalkylene ether.

2. A filter material according to claim 1, wherein the gas transmissivity, as a measure of the liquid transmissivity, at a pressure drop of 200 Pa, measured according to DIN 53887, lies in the range from 1 to 300 l/dm² per minute.

3. A filter material according to claim 1, wherein the yarns consist of at least 95 wt. %, referred to total yarn weight, of a thermoplastic, elastomer copolyether ester according to claim 1.

4. A filter material according to claim 1, wherein the long-term dimensional stability, expressed by the tensile stress coefficient $C_{100}$ of the yarns after the 100th elongation cycle, is greater than 0.60, preferably greater than 0.65, where $C_{100}$ is determined by the hysteresis tensile test of DIN 53835 Part 2 with an elongation cycle between 5 and 10%, a prestress of 0.25 cN/tex, a free strung length of 500 mm and a clamp velocity of 500 mm/minute.

5. A filter material according to claim 1, wherein the yarn is a monofilament.

6. A filter press comprising a filter material according to claim 1.

7. A filter press, characterized by containing a filter material according to claim 1.

8. A method of producing a filter material according to claim 1, by weaving, netting, spiraling or knitting one or more synthetic yarns according to claim 1, thereby producing an areal textile configuration, and finishing the areal textile configuration by thermally pressing, calendering or fixing, to produce a filter material.

* * * * *